Patented Nov. 7, 1950

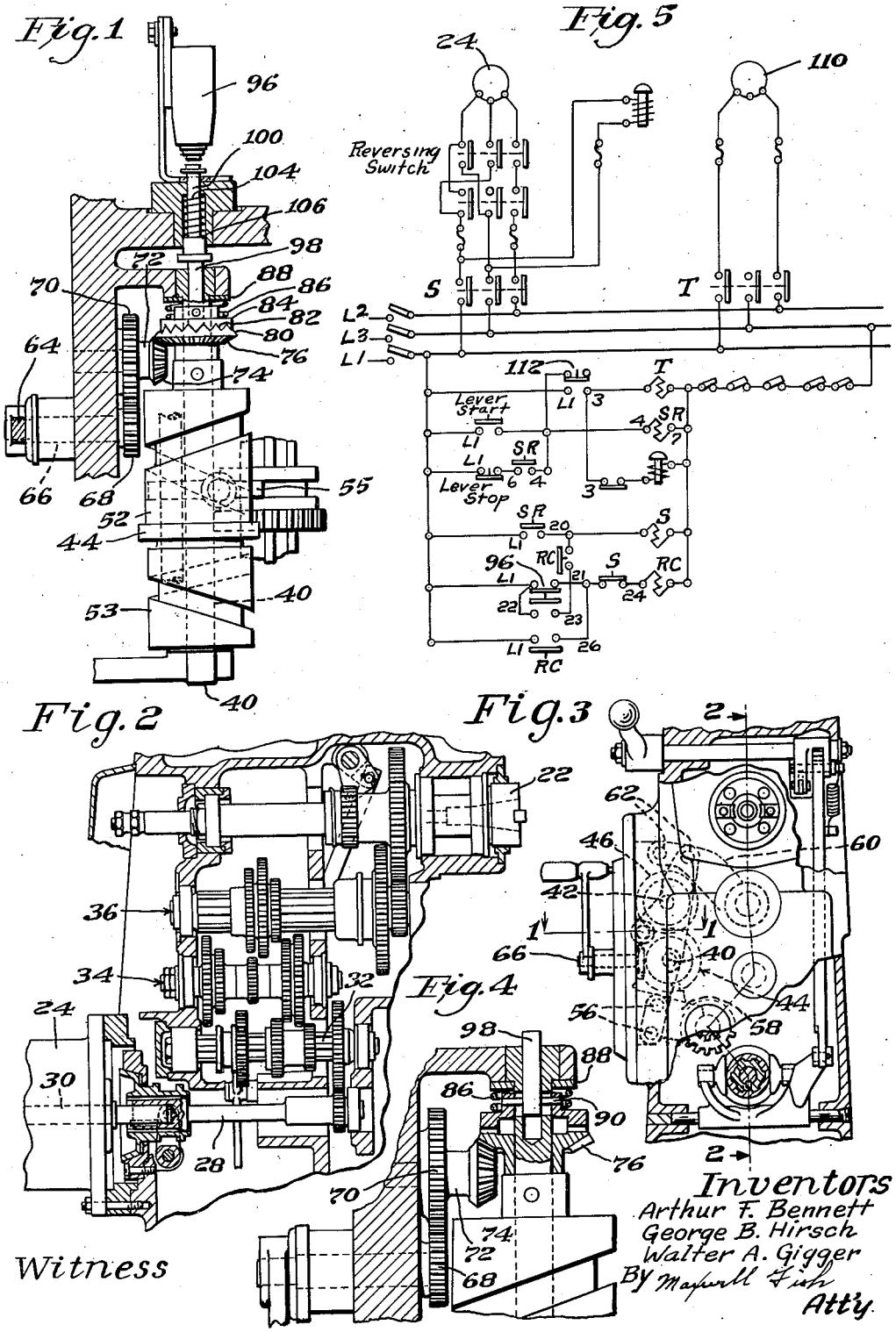

2,529,067

UNITED STATES PATENT OFFICE 2,529,067

GEARSHIFT CONTROL MECHANISM

Arthur F. Bennett, West Barrington, George B. Hirsch, Providence, and Walter A. Gigger, Barrington, R. I., assignors to Brown and Sharpe Manufacturing Company, a corporation of Rhode Island Application January 24, 1948, Serial No. 4,194

14 Claims. (Cl. 74—472)

This invention relates to improvements in change speed mechanism for machine tools, and more particularly to an improved gear shift control mechanism adapted for effecting successive manual adjustments of a multiple speed gear driving train.

The invention is particularly illustrated as embodied in a multiple speed drive for the milling cutter spindle of a milling machine in which the spindle is driven from an electric motor through a variable speed gear train capable of manual adjustment to produce a relatively large number of speed variations.

It is a principal object of the invention to provide a novel and improved construction and mode of operation of the gear shifting devices to permit successive adjustments of a manual control to be made with speed and certainty and to eliminate any possible blocking of the shifting mechanism through failure of the gears to mesh properly with one another.

In accordance with the invention, a manually operable gear shifting device is employed having embodied therein a mechanism which is responsive to any increased resistance transmitted through the connections as a result of a block in the change speed gearing to impart a driving impulse through the variable speed driving train so that unblocking of the gearing is effected and the shifting gears are permitted to move into the position of intended adjustment. It will be understood that with the novel construction provided in accordance with the invention, a driving impulse is imparted through the variable speed driving train only in the event that a block has occurred to prevent completion of a shift in position of the change speed gearing. Further in accordance with the invention, a device is provided for controlling the extent of the driving impulse imparted to the driving elements of the gear train. It has been found that a driving impulse of short duration and at a relatively slow speed provides the most favorable conditions for the removal of any block or obstruction to the shifting of the gears.

With the above noted and other objects in view, as may hereinafter appear, the several features of the invention consist also in the devices, combinations and arrangement of parts hereinafter described and claimed which, together with the advantages to be obtained thereby, will be readily understood by one skilled in the art from the following description taken in connection with the accompanying drawings, in which Fig. 1 is a fragmentary plan view partly in section taken on the line 1—1 of Fig. 3, showing the manually operable control for effecting successive shifts in the position of the change speed gear driving connections for the spindle of a milling machine; Fig. 2 is a detailed view in left side elevation of the change speed driving gears through which the drive is transmitted from an electric driving motor to the milling cutter spindle; Fig. 3 is a view of the spindle drive in front elevation, showing the driving gear train of Fig. 2, and illustrating additionally the relationship of the manually operable shift mechanism with relation thereto; Fig. 4 is an enlarged detail view of the driving connections from the manually operable control as shown in Fig. 1, but with parts sectioned to illustrate particularly the yieldable clutch connection for operating the motor jog switch; and Fig. 5 is an electrical diagram indicating generally the arrangement and mode of operation of the electrical operating controls for the milling machine including the motor jog switch control of the present invention.

The gear shift control mechanism which forms the subject-matter of the present invention, is shown in the drawings as applied to a variable speed transmission for the milling cutter spindle of a milling machine. The spindle driving mechanism shown, is similar, except as hereinafter specifically pointed out, to the spindle driving mechanism of the milling machine more fully illustrated in the United States Letters Patent to Bennett No. 2,363,934, dated November 28, 1944. Only so much of the milling machine referred to, including the spindle drive and electrical control devices therefor are here shown as is believed necessary to show the connection of the invention therewith.

Referring specifically to the drawing, in Fig. 2 is shown a milling cutter spindle 22 which is driven from an electric motor 24 through variable speed driving connections which may be of ordinary description. These connections comprise a driving shaft 28 connected to the armature shaft 30 of the motor, and intermediate shafts 32, 34 and 36 supporting thereon shiftable gears and gear clusters through which the variable speed drive is transmitted to the spindle 22.

The devices for shifting the gears of the variable speed transmission may be of ordinary description, comprising a pair of gear shifter supporting shafts 40, 42 which are connected to be rotated one from the other, and in synchronized relation to one another by means of intermittent gears generally indicated at 44 and 46 in Fig. 2.

Shaft 40 has mounted thereon a pair of shifter drums 52, 53 (see Fig. 1), and shaft 42 has similarly mounted thereon a pair of shifter drums generally indicated at 54 in Fig. 3. The shifter drum 52 is formed with a peripheral cam track which is engaed by a follower formed integrally with a gear shifter 55 slidably supported on guide rods 56. The follower associated with shifter drum 53 is indicated in dotted lines at 58 in Fig. 3. The followers for drums 54 on the shaft 42 as generally indicated at 60 in Fig. 3, are mounted on guide rods 62. These parts being well known in the art, are believed to need no further illustration.

Rotational movement is imparted to the shafts 40, 42 to effect successive shifts of the variable speed gear transmission by means of a manually operable controller 64 which is connected to the shaft 40 through a reduction gear train, the several parts being proportioned and so related to one another that each successive revolution of the controller 64 will produce one shift in a series or progression of speed changes of the variable speed mechanism. As shown in Fig. 3, the controller 64 is mounted on a shaft 66 provided at its inner end with a pinion 68 arranged to mesh with a pinion 70 on a stub shaft 72 which is also formed with a bevelled gear 74 arranged to mesh with a bevelled sleeve gear 76 supported to turn loosely on the drum supporting shaft 40.

In accordance with the invention, a yieldable connection is provided in the connections from the controller 64 to the gear shifting devices including the drum supporting shafts 40, 42, the drums mounted thereon and followers 55, 58 and 60. The yieldable connection referred to, as shown in Figs. 1 and 4, comprises a pair of cooperating clutch elements including a clutch face 80 with tapered teeth formed on the driving sleeve gear 76, and a cooperating clutch face 82 with tapered teeth formed on a clutch sleeve 84 which is keyed to turn with and is axially shiftable on drum supporting shaft 40. A spring 86 coiled above the sleeve hub of the clutch sleeve 84 between a shouldered portion of the clutch sleeve and a stationary abutment 88 acts normally to maintain the clutch elements in closed position with relation to one another to provide a solid driving connection. The driven clutch member 84 is keyed to turn with the drum supporting shaft 40 by means of a transverse pin 90.

With the construction and arrangement of the connections from the manually operable controller 64 above described, for shifting the change speed gears, movement of the controller 64 through one revolution acting through the solid driving connection provided by the clutch faces 80, 82, will effect a corresponding shift in the setting of the change speed gears. In the event, however, that a block is encountered in the movement of the gear shifting devices because of the failure of the gears to move properly into mesh with one another, a greater than normal resistance will be encountered to the movement of the controller 64 which will cause a small relative movement to take place between the clutch faces 80, 82 with an accompanying axial movement of the clutch sleeve 84 against the pressure of its spring 86. It will be understood that the axial movement permitted to the clutch sleeve 84 is insufficient to permit the tapered teeth of the clutch faces 80, 82 to become fully separated so that the controller 64 is maintained at all times in its synchronized relation to the gear shifting devices.

Further in accordance with the invention, the axial movement of the clutch sleeve 84 in response to a greater than normal resistance to the movement of the controller 64 brought about by a block in the gear shifting devices, is employed to impart a starting impulse to the spindle motor. The movement so imparted to the gears of the variable speed transmission will then cause the block to be cleared so that the operator is enabled to continue the shifting movement of the controller 64 to complete the shifting movement of the gears. As the strain through the operating connections from the controller 64 is eased by the free movement of the gears to their adjusted position, the clutch sleeve 84 will return under the influence of its spring 86 to re-establish a solid driving connection between the clutch faces 80, 82.

For starting the motor in accordance with the operation above set forth, a motor jog switch 96 is provided which is arranged to be controlled by connections actuated by the axial movement of clutch sleeve 84 brought about by a block in the gear shifting devices as above set forth. As shown in Fig. 1, the driven clutch member 84 is connected by the transverse pin 90 with a switch control plunger 98 fitted into an axial bore in the drum supporting shaft 40. At its outer end the plunger 98 is arranged to engage a spring-pressed plunger 100 which is supported in a bearing 102 of the machine frame, and at its opposite end engages against the contact element of the motor jog switch 96. A compression spring 104 coiled about the plunger 100 between an abutment on the bearing and a shoulder 106 on the plunger, acts to maintain the plunger 100 in contact with the plunger 98.

Further in accordance with the invention, a device is provided to control the extent of the starting impulse imparted to the spindle motor by the operation of motor jog switch 96 so that the spindle motor will be stopped before it has picked up an excessive amount of speed, and the driving elements of the gear train will be moved by a small amount only and at a slow rate which has been found most favorable to assist in the removal of any block or obstruction to the shifting of the gears.

In the illustrated form of the invention, electrical means in the form of a relay is provided which operates in conjunction with the operation of the jog switch to again shut off the spindle driving motor after it has started and before the motor has picked up any great amount of speed. The electrical driving and control devices for the illustrated machine embodying the automatically controlled jog switch and relay of the present invention is particularly illustrated in the electrical diagram Fig. 5 of the drawings. The electrical connections as shown, except as hereinafter specifically pointed out, may be similar to those shown in the patent to Bennett above referred to.

As shown in Fig. 5, power is supplied from a three-phase power line having wires L1, L2 and L3 to a table motor 110 and to the spindle motor 24. A starting and stopping switch comprising a relay T with switch contacts controlled thereby, designated also by the letter T, is provided for starting and stopping the table motor. A similar starting and stopping switch comprising a relay S and switch contacts actuated thereby, designated also by the letter S, is provided for starting and stopping the spindle motor. In the illustrated form of the invention, for the control of the spindle motor there is provided additionally, a secondary relay switch SR which when energized by pressing a lever start switch, in turn energizes the spindle motor switch solenoid S. In the illustrated construction, there is also provided a relay solenoid RC which is connected to be operated in connection with the automatically operated motor jog switch 96 previously described, to again disconnect the spindle motor S after a starting impulse has been imparted thereto through the operation of the jog switch 96.

The operation of the control devices above referred to, will be briefly described as follows. Assuming that it is desired to start the machine in operation including the table motor and spindle motor, the lever start switch is depressed to close contacts L1—4, thus energizing the table motor switch solenoid T to start the table motor 110, and energizing the secondary relay SR. SR contacts 6—4 close, forming a locking circuit for the solenoid T and secondary relay SR. SR contact L1—20 closes, energizing the spindle motor switch solenoid S to start the spindle motor 24. In order to stop the machine from operation, the lever stop switch may be pressed, opening the contacts L1—6 to de-energize the solenoid T and secondary relay SR. Switch T opens to de-energize the table motor 110, and secondary relay SR contacts L1—20 open to de-energize the solenoid S, causing the contacts of main spindle motor switch S to open to de-energize the spindle motor.

The operation of the electrical connections illustrated in Fig. 5, in the event that a block occurs in the shifting of the change speed gears upon manual operation of handle 64, is as follows. Assuming that a block in the change speed gears has occurred and that the driven clutch sleeve member 84 has been forced longitudinally to depress the jog switch 96, it will readily be seen that contacts L1—21 will open, and that at the same time contacts 22—23 will close. As will readily be seen from an inspection of Fig. 5, the relay RC is normally energized with the machine in stop position through the closed contacts L1—21 of jog switch 96 and normally closed S contacts 21—24. Since relay RC is energized, switch contacts 20—23 as well as RC holding circuit contacts L1—26, are closed. Closing of contacts 22—23 when jog switch 96 is depressed, has the effect of energizing the spindle motor solenoid S, causing the main spindle switch contacts S to close to start the spindle motor 24. At the same time, S contacts 21—24 open to de-energize the relay RC. Thereupon RC contacts 20—21 and L1—26 open, and spindle motor solenoid S is thus de-energized, causing main switch contacts S to open to stop the spindle motor. In the meantime, jog switch 96 will have moved back to its normal position shown in full lines in Fig. 5, as the block is removed, and the elements of the shiftable clutch connection resume their normal solid position. The several elements of the electrical control system are returned to their initial starting position as the closing of jog switch contacts L1—26 causes the relay RC again to be energized through the now closed S switch contacts 21—24. RC contacts L1—26 and 20—23 close.

It will be understood that the invention is not limited to the specific embodiment shown, and that various deviations may be made therefrom without departing from the spirit and scope of the appended claims.

What is claimed is:

1. In a machine tool having a movable part, an electric motor, and a variable speed transmission including relatively shiftable gears through which the motor is connected to drive the movable part, a gear shift control mechanism which comprises a movable shifting element, devices controlled thereby for shifting the gears, and a connection between the shifting element and said devices including a yieldable element responsive to a greater than normal resistance to the shift of said gears initiated by said control element, and a controller actuated by said yieldable element to impart a starting impulse to the electric motor.

2. In a machine tool having a movable part, an electric motor, and a variable speed transmission including relatively shiftable gears through which the motor is connected to drive the movable part, a gear shift control mechanism which comprises a shifting element movable to predetermined positions to effect successive shifts in the positions of said gears, devices connected to be moved by said shifting element to shift the gears, a connection between said shifting element and devices including means responsive to a greater than normal resistance to the shifting of said gears by the shifting element, and a controller actuated by said resistance responsive means to impart a starting impulse to the electric motor.

3. In a machine tool having a movable part, a driver, means to start and stop the driver, and a variable speed transmission including relatively shiftable gears through which the driver is connected to drive the movable part, a gear shift control mechanism which comprises a shifting element and operating devices movable by said shifting element to predetermined positions to effect successive shifts in the positions of said gears, a yieldable element in said operating devices responsive to a greater than normal resistance to the shifting of said gears by the shifting element transmitted through said operating devices, and a controller actuated by said yieldable element to impart a jogging start and stop impulse to said driver.

4. In a machine tool having a movable part, a driver, means to start and stop the driver, a jogging device to impart a brief starting impulse to the driver, and a variable speed transmission including relatively shiftable gears through which the driver is connected to move the movable part, a gear shift control mechanism which comprises a manually operable shifting element, devices controlled thereby for shifting the gears, an operating connection between the control element and shifting devices including relatively movable elements, and biasing means acting thereon to maintain a normally solid connection through said elements between the shifting element and gear shifting devices, and means including a controller for said jogging device actuated by relative movement of said elements induced by a greater than normal resistance to shifting of said gears by the shifting element to impart a jogging start and stop impulse to said driver.

5. In a machine tool having a movable part, an electric motor, and a variable speed transmission including relatively shiftable gears through which the motor is connected to move the movable part, a gear shift control mechanism which comprises a manually operable shifting member, devices controlled thereby for shifting the gears, an operating connection between the control element and shifting devices including relatively movable elements, and biasing means acting thereon to maintain a normally solid connection through said elements between the shifting element and gear shifting devices, switch controls operative to start and stop the motor including a jog control to impart a brief starting impulse to the motor, and means rendered operative by relative movement of said elements induced by a greater than normal resistance to the shifting of said gears by the shifting element for actuating said switch controls to impart a jogging start and stop impulse to the motor.

6. In a machine tool having a movable part, an electric motor, and a variable speed transmission including relatively shiftable gears through which the motor is connected to drive the movable part, a gear shift control mechanism which comprises a manually operable shifting element, devices controlled thereby for shifting the gears, a driving connection between the manual control element and said shifting devices having relatively movable driving and driven elements, and yieldable means for maintaining a normally fixed relative driving relation therebetween, and mechanism arranged to be actuated by the relative movements of the elements of said connection including a motor jog switch to start and stop the motor.

7. In a machine tool having a movable part, an electric motor, and a variable speed transmission including relatively shiftable gears through which the motor is connected to drive the movable part, a gear shift control mechanism which comprises a movable shifting element, gear shifting devices, actuating connections from said shifting element to said gear shifting devices including meshing tapered clutch elements adapted for relative axial movement, spring means acting to maintain said clutch elements normally in a relatively fixed axial relation, a motor jog switch, and a controller rendered operative by relative axial movement of said clutch elements responsive to a greater than normal resistance to the shifting of said gears by the shifting element to move said switch to start position.

8. In a machine tool having a movable part, an electric motor, and a variable speed transmission including relatively shiftable gears through which the motor is connected to drive the movable part, a gear shift control mechanism which comprises a movable shifting element, gear shift devices, connections between the shifting element and gear shift devices for controlling said devices to shift the gears including a motion transmitting connection adapted to yield in response to movement of said shifting element against a block in the movement of the gear shifting devices, a motor jog switch, and an actuating member controlled by a yielding movement of said motion transmitting connection for actuating the motor jog switch to impart a starting impulse to the motor.

9. In a milling machine having a milling cutter spindle, an electric motor and a variable speed transmission including relatively shiftable gears through which the motor is connected to drive the milling cutter spindle, a gear shift control mechanism which comprises a manually operable shifting element, gear shifting devices, and connections between the shifting element and gear shift devices for actuating said devices including driving and driven clutch elements having cammed engaging surfaces whereby any change in the relative driving position of said elements is effective to displace one relative to the other, spring means for maintaining said elements including the cammed surfaces thereof normally in fixed relation to one another, and a motor control device responsive to a relative displacement of said clutch elements to impart a starting impulse to the motor.

10. In a milling machine having a milling cutter spindle, an electric motor and a variable speed transmission including relatively shiftable gears through which the motor is connected to drive the milling cutter spindle, a gear shift control mechanism which comprises a manually operable shifting element movable to predetermined positions to effect successive shifts in the positions of said gears, gear shifting devices, and connections between the shifting element and gear shift devices for actuating said devices including meshing tapered clutch elements adapted for relative axial movement, spring means for relatively moving the clutch elements solidly together responsive to a greater than normal resistance to the shifting of the gears by the shifting element to permit a relative axial movement of said clutch elements, a motor control device, and a controller rendered operative by said relative axial movement of the clutch elements to start the motor.

11. In a machine tool having a movable part, power driving means, and a variable speed transmission including relatively shiftable gears through which the motor is connected to drive the movable part, a gear shift control mechanism which comprises a manually operable shiftable element movable to predetermined positions to effect successive shifts in the positions of said gears, gear shifting devices, a motion transmitting connection between the shiftable element and the gear shifting devices for controlling said devices to shift the gears having elements relatively movable to and from a solid position, means acting to maintain said elements normally in said solid position arranged to permit a relative yielding movement of said elements in response to a greater than normal resistance through said connection to the shifting of the gears by the shifting element, and control means responsive to the relative movement of said elements to render said driving means operative and inoperative to drive the gear train, whereby relative movement of said elements away from the solid position is effective to impart a momentary driving impulse to the gear train.

12. In a milling machine having a milling cutter spindle, an electric motor, a variable speed transmission including relatively shiftable gears through which the motor is connected to drive the milling cutter spindle, a gear shift control mechanism which comprises a manually operable shifting member, gear shifting devices, a driving connection between the shifting element and gear shifting devices consisting of relatively movable driving and driven elements and biasing means acting thereon to maintain a normally solid driving connection between said elements, and spindle motor operating means responsive to relative movement of said elements induced by excessive resistance to the shifting of said gears by the shifting element including a switch control operative to start the motor, and a relay operative thereafter to stop the motor.

13. In a milling machine having a milling cuttter spindle, an electric motor, a variable speed transmission including relatively shiftable gears through which the motor is connected to drive the milling cutter spindle, a gear shift control mechanism which comprises a manually operable shifting member, gear shifting devices, a normally solid driving connection between the shifting element and gear shifting devices consisting of relatively movable driving and driven elements and biasing means acting thereon to maintain said connection solid, and a spindle motor operating control arranged to be rendered operative by relative movement of said driving and driven elements including a motor jog switch operative to start the motor, and a relay operative thereafter to stop the motor.

14. In a milling machine having a milling cutter spindle, an electric motor, a variable speed transmission including relatively shiftable gears through which the motor is connected to drive the milling cutter spindle, a gear shift control mechanism which comprises a manually operable shifting member, gear shifting devices, a normally solid driving connection between the shifting element and gear shifting devices consisting of relatively movable driving and driven elements and biasing means acting thereon to maintain said connection solid, and spindle motor operating connections including a relay actuated spindle motor start and stop switch, a secondary relay and a starting control for energizing said secondary relay to operate said motor start switch, a jog switch responsive to relative movement of said driving and driven elements to energize said motor start switch, and a relay rendered operative by said jog switch thereafter to de-energize the spindle motor switch.

ARTHUR F. BENNETT.
GEORGE B. HIRSCH.
WALTER A. GIGGER.

REFERENCES CITED

The following references are of record in the file of this patent:

UNITED STATES PATENTS

| Number | Name | Date |
|---|---|---|
| 1,588,004 | Blood | June 8, 1926 |
| 2,110,173 | Pohl et al. | Mar. 8, 1938 |
| 2,164,884 | Nenninger et al. | July 4, 1939 |